Feb. 16, 1943. J. S. LUNDVALL Re. 22,271

CONVERTIBLE BULKHEAD FOR REFRIGERATOR CARS

Original Filed Feb. 1, 1940 6 Sheets-Sheet 1

Inventor:
John S. Lundvall,
By Casper W. Oons
Attorney.

Feb. 16, 1943. J. S. LUNDVALL Re. 22,271

CONVERTIBLE BULKHEAD FOR REFRIGERATOR CARS

Original Filed Feb. 1, 1940 6 Sheets-Sheet 2

Inventor:
John S. Lundvall,
By Casper W. Ooms
Attorney.

Feb. 16, 1943. J. S. LUNDVALL Re. 22,271

CONVERTIBLE BULKHEAD FOR REFRIGERATOR CARS

Original Filed Feb. 1, 1940 6 Sheets-Sheet 3

Inventor:
John S. Lundvall,
By Casper W. Ooms
Attorney.

Feb. 16, 1943. J. S. LUNDVALL Re. 22,271

CONVERTIBLE BULKHEAD FOR REFRIGERATOR CARS

Original Filed Feb. 1, 1940 6 Sheets-Sheet 4

Inventor:
John S. Lundvall,
By Casper W. Ooms
Attorney.

CONVERTIBLE BULKHEAD FOR REFRIGERATOR CARS

Original Filed Feb. 1, 1940 6 Sheets-Sheet 5

Inventor:
John S. Lundvall,
By Cooper W. Oons
Attorney.

CONVERTIBLE BULKHEAD FOR REFRIGERATOR CARS

Original Filed Feb. 1, 1940 6 Sheets-Sheet 6

Inventor:
John S. Lundvall,
By Cooper W. Owen
Attorney.

Reissued Feb. 16, 1943

Re. 22,271

UNITED STATES PATENT OFFICE 22,271

CONVERTIBLE BULKHEAD FOR REFRIGERATOR CARS

John S. Lundvall, Chicago, Ill., assignor to Union Asbestos & Rubber Company, Chicago, Ill., a corporation of Illinois Original No. 2,238,700, dated April 15, 1941, Serial No. 316,708, February 1, 1940. Application for reissue December 15, 1941, Serial No. 423,083

24 Claims. (Cl. 62—19)

This invention relates to a convertible bulkhead for refrigerator cars and has for its object to provide an improved convertible bulkhead by which an ice-refrigerated car may be converted into a ventilated car.

Most refrigerator cars are used intermittently as refrigerator cars in which the lading is cooled with a quantity of ice loaded into ice bunkers at one end or both ends of the car, and intermittently as ventilated cars in which the lading is ventilated by a stream of air inducted into the car through hatches in the car roof at one end of the car and emitted through other hatches at the other end of the car after circulation through the car lading. Some refrigerator cars are used as much as three-fourths of the time as ventilated cars.

If fixed ice bunkers are used in refrigerator cars, the space which they occupy cannot be used for lading and the cargo capacity of a refrigerator car, when used as a ventilated car, is correspondingly limited. Collapsible ice bunkers have been devised to permit the structure of the ice bunkers to be collapsed and to render most of the space occupied by the bunkers available for cargo and thus to increase the portion of the car available for lading when no ice is required.

An object of this invention is to provide a convertible bulkhead between the ice bunkers and the body of the car which when extended will serve as the forward wall of an ice bunker, and when collapsed will so intermesh with the other structural units of the ice bunker as to render the entire capacity of the car available for lading. The bulkhead and related structural members are so designed as to make the floor of the car continuous, provide vents and ducts along the car walls for the passage of air currents, and leave no structural members to interfere with the ready use of the car when employed as a ventilated car.

A further object of the invention is to provide an improved bulkhead which may be readily removed to the end of a car and the respective parts folded and nested into each other and the car walls so as to render the entire space within the car available for lading.

A further object of the invention is to provide a convertible bulkhead compact in construction but nevertheless sufficiently sturdy to sustain the load of ice required and to withstand the heavy shocks to which it is subjected in the travel of the refrigerator car.

A further object of the invention is to provide a convertible bulkhead, which, with the related structural units, will each serve several functions, both when in collapsed position and when in extended position.

A further object of the invention is to provide a convertible bulkhead with related structural units that will readily permit the car to be fitted with a collapsible ice bunker for ice-refrigeration, or changed from an ice-refrigerated car to a ventilated car without the addition of any equipment other than that of which the collapsible ice bunker is constructed.

A further object of the invention is to provide a convertible bulkhead which, when in extended position to form a collapsible ice bunker can be easily interlocked into a rigid structure without the use of external appliances.

A further object of the invention is to provide a convertible bulkhead and related structure which will form a collapsible ice bunker, which, when collapsed, will provide a floor for the end of the car and a pilfer-proof enclosure so as to render the car an efficient and safe car when used as a ventilated car without ice refrigeration.

A further object of the invention is to provide a floor rack and hatch closure which, when in collapsed position, will form a perforated wall for the collapsible ice bunker to form ducts which separate the ice load from the car wall and to permit the free flow of air about the ice and through the ducts so formed.

A further object of the invention is to provide a convertible bulkhead and ice-grates which will nest into each other against the car wall and form ventilation ducts along the wall.

Other objects, advantages and capabilities of the invention will appear from the following description of a preferred embodiment thereof, taken in conjunction with the accompanying drawings, in which.

Figure 1:
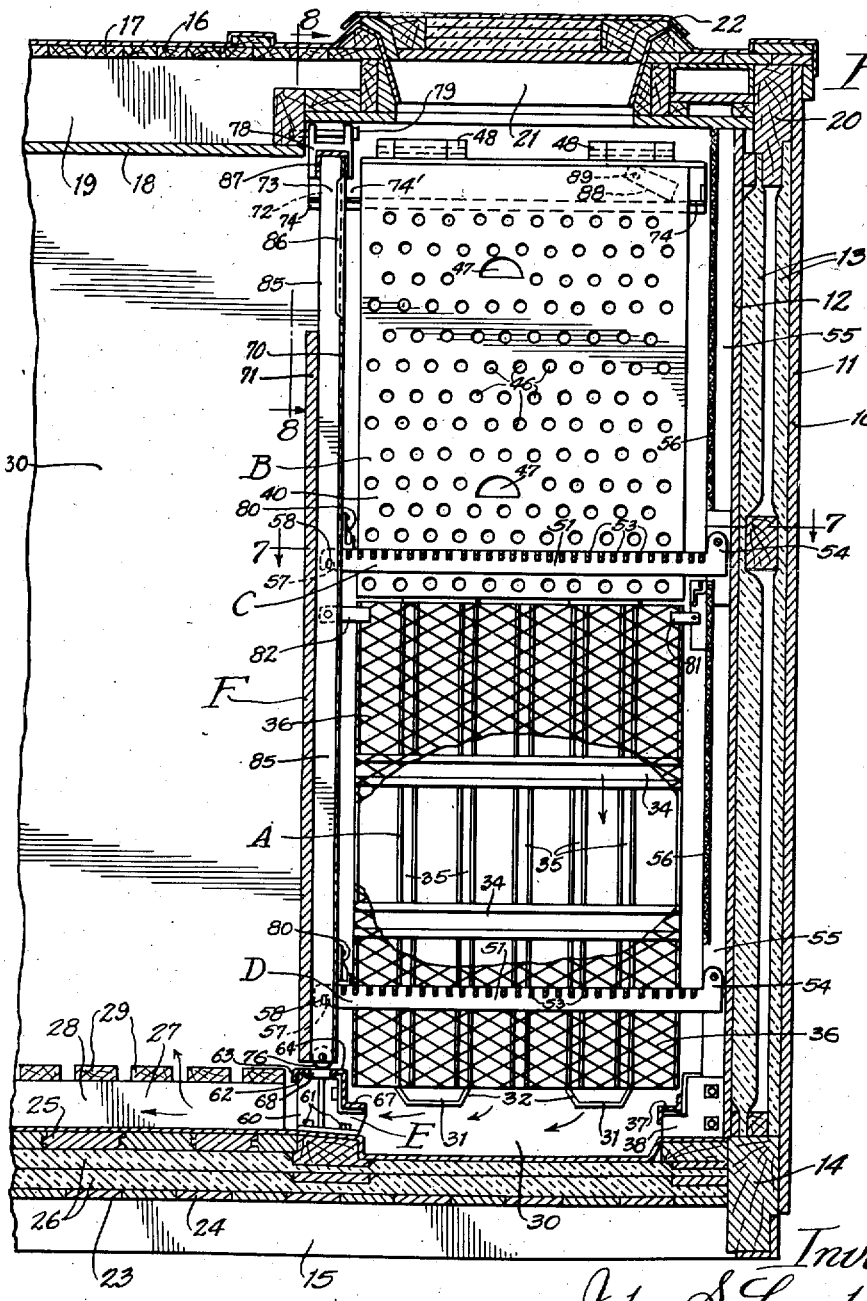
Figure 1 is a longitudinal sectional elevation of one end of a refrigerator car with the convertible bulkhead installed and in extended position to form a collapsible ice bunker ready to receive its load of ice.

Referring to the drawings, the reference numeral 10 indicates the end wall of a refrigerator car composed of the conventional outer wall 11, inner sheathing 12 and interposed insulation 13. The end wall 10 is supported upon conventional structural members, such as the transverse sill 14 and the longitudinal sill 15. The roof of the car 16 is of conventional construction with the roof deck 17 separated from the ceiling 18 by an air space 19, which may suitably be filled with an insulating material. The roof is supported by the transverse frame member 20.

At each end of the car and on both sides of the roof, openings or hatches 21 are made within the roof to give access to the ice compartment within the car for loading ice into the car and to provide for a means for ventilating the car when the car is used without ice and operated merely as a ventilated car. The hatch 21 is closed by the hatch cover 22. Only one hatch is shown on the drawings. Another hatch is normally provided on the other side of the car and a similar pair of hatches at the other end of the car.

The floor of the car 23 is of suitable sturdy construction with conventional structural members supporting the floor such as the longitudinal sill 15 supporting the transverse lower floor planks 24 and the upper floor planks 25, between which a suitable insulating filler 26 is interposed. Above the upper floor planks 25 is maintained the main floor rack 27, normally removable for cleaning, which is composed of longitudinal stringers 28 which run the length of the body of the car and transverse planks 29. The planks 29 are separated from each other by crevices to form a rack upon which the lading within the car may be supported, but which will nevertheless permit the passage of the current of air passing along the floor of the car through the fissures between the planks and through the lading.

The description this far has been of conventional refrigerator car construction. The essential features of this invention are found in the respective improvements hereinafter described. More particularly, these are the ice bunker floor rack A shown retracted against the car wall in Fig. 1 and swung into position as part of the car floor in Fig. 2; the pilfer-proof hatch closure B shown retracted against the car wall in Figs. 1 and 4 and in extended position to close the hatch in Figs. 2 and 3; the ice grates C and D shown in extended position in Figs. 1 and 7, and in collapsed position in Figs. 2 and 3; the permanent base E for the convertible bulkhead shown in section in Figs. 1 and 2 and in detail in Figs. 5 and 6; and the convertible bulkhead F which is shown in extended position in Figs. 1, 7 and 8, and in retracted position in Fig. 2.

*The ice bunker floor rack A*

Figure 2:
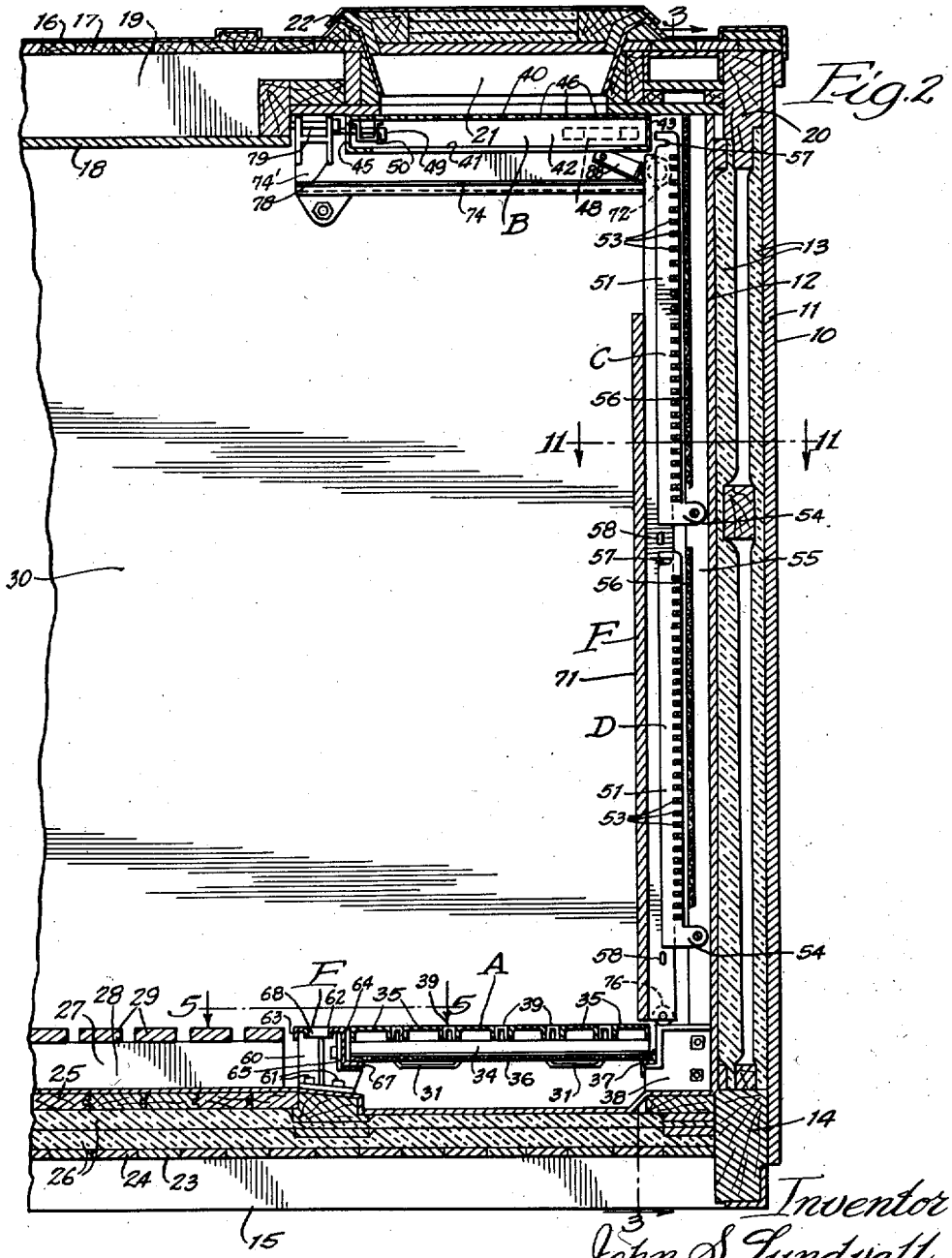
Fig. 2 is a longitudinal sectional elevation of the same end of a refrigerator car with the convertible bulkhead in retracted position and the floor member and hatch grid in extended position.
Figure 3:
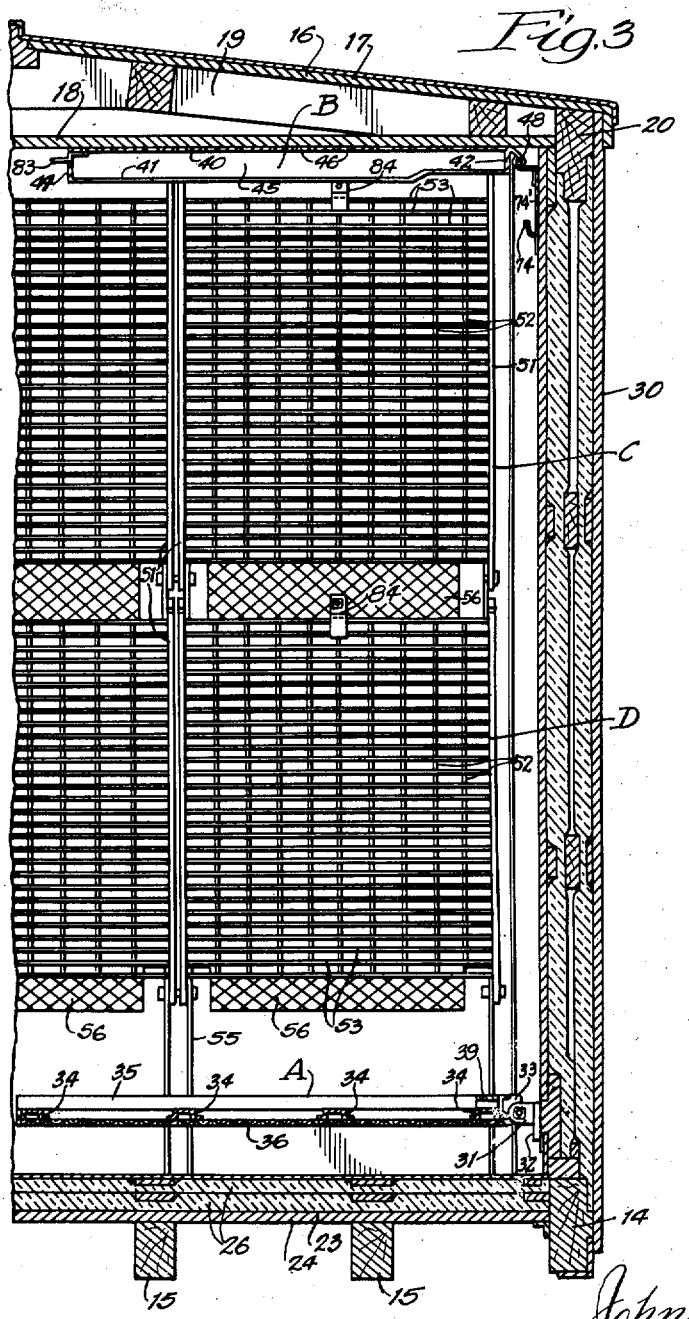
Fig. 3 is a transverse sectional elevation of a portion of the same end of the refrigerator car taken on the line 3—3 of Fig. 2, with the bulkhead in retracted position.
Figure 4:
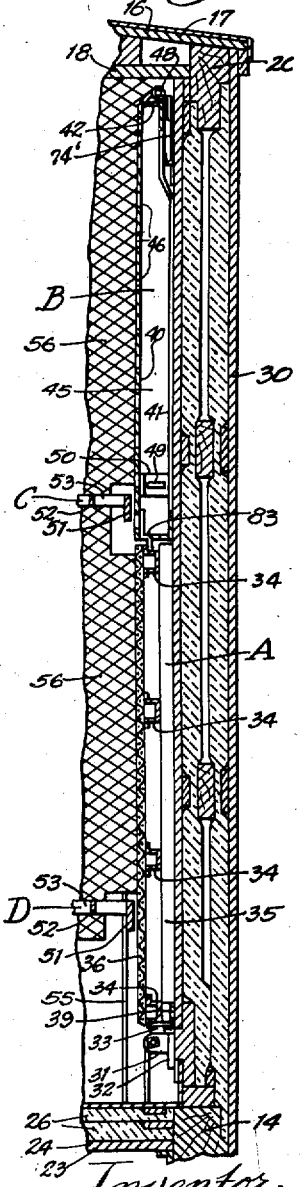
Fig. 4 is a fragmentary sectional elevation of the side wall of the refrigerator car with the bulkhead in extended position and the floor member and hatch grid in retracted positions.
Figure 5:
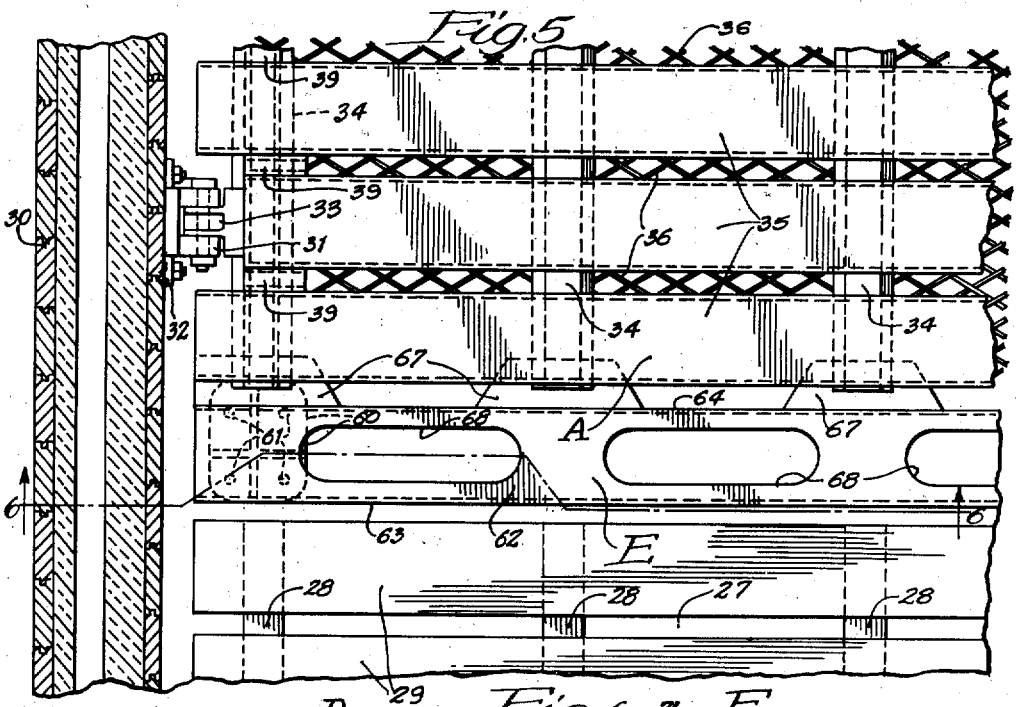
Fig. 5 is a fragmentary sectional plan view of a portion of the floor of the refrigerator car taken on the line 5—5 of Fig. 2.

The ice bunker floor rack A is shown in retracted position against the side wall of the car in Fig. 1, in lowered position to form an extension of the refrigerator car floor rack 27 in Fig. 2, where a longitudinal section is shown and in Fig. 3, where a transverse section is shown. A transverse section of the rack collapsed against the side wall of the car is also shown in Fig. 4 and a fragment thereof in Fig. 7. A fragmentary plan sectional detail is shown in Fig. 5.

Two of these floor racks are preferably used at each end of the car, one reaching from the side of the car to the middle thereof, the other reaching from the opposed side to the middle, thus increasing the facility with which they may be swung into and out of position. Only one rack is shown.

Each floor rack A is pivotally mounted to the side wall 30 of the refrigerator car by the hinges 31 which may be of any number adequate to support the floor rack and the lading which it is designed to sustain. The knuckles 32, of these hinges are mounted on the side walls of the car near the end of the car and within that length of the car which is occupied by the collapsible ice bunker. The hinge straps 33 are secured to the floor rack A, which is composed of the longitudinal channel beams 34 and the transverse floor members 35. These transverse floor members are shown in the form of inverted channels mounted, like the floor planks 29, in spaced relation to provide space for the free passage of air through the floor and the lading borne thereby. While both the longitudinal channel beams 34 and the transverse floor members 35 are shown of hollow metal construction, welded together, they may suitably be formed of other materials.

Between the adjacent transverse floor members 35 are mounted a row of short channel members 39, which, with the members 35, form a track for the passage of the lower wheels 76 upon which the bulkhead F is borne. This will be referred to in a later passage in this specification.

Beneath the longitudinal channel beams 34 is mounted a grid 36. This grid is designed to provide a perforated wall of the ice bunker when the floor rack A is folded against the side of the car to separate the ice load from the wall of the car and to permit free circulation of air along the car walls and through the interstices of the grid against which the ice is piled. When the grid is in the vertical position the longitudinal channel beams 34 and the transverse floor members 35 serve to space the grid 36 from the wall and to provide air passages or convection ducts along the wall for the free passage of air along the ice load when the ice bunker is filled with ice. For this purpose the hollow metal construction is particularly suitable both because of the increased conductivity of the metal members over other materials such as wood and because of the increased volume of passage available for the movement of the air current.

When the floor rack A is in lowered position, the free sides rest upon the aprons 67 upon the bulkhead support E, and the transverse ledge 37 formed upon the beam 38 at the end of the car. In this position, the grid 36 together with the separated longitudinal channel members 34 and the transverse floor members 35 form a continuation of the floor rack 27, with the surface of the transverse floor members at the same level as the floor planks 29, and render the end of the car available for lading without the intervention of any obstacles or variation in the floor level. The construction is such that air may readily pass through this collapsible floor rack to permit ventilation of the lading and to present no obstacle to the free passage of the air along the floor of the car and through the permanent floor rack 27 in the body of the car.

The refrigerator car is provided with small pivoted latches 81 and 82 secured to the side walls of the car which may be swung down to engage the end of the floor rack to hold it in vertical position as shown in Fig. 1.

*The pilfer-proof hatch closure B*

In Fig. 1 the pilfer-proof hatch closure B is shown swung down against the side wall of the car, a position which it occupies when the car is used as an ice-refrigerated car. In Fig. 4 the member B is shown in the same position in section. In Figs. 2 and 3 the member is shown in a horizontal position, swung across and under the car hatch, a position in which the closure is supported when the car is used as a ventilated car.

The hatch closure B is composed of a flat hollow structure made up of the flanged surface plate 40, its edges turned down to form channel sections to give the member rigidity and to form the respective end and side walls 42, 43, 44 and 45, all flanged with the horizontal flange 41 running about the inner lower edge of the end and side walls. The upper surface plate 40 may be perforated at frequent intervals by the perforations 46 which are best shown in Fig. 1. Similar perforations may be provided in the end and side walls 42—45.

The upper surface plate is also cut with suitable openings 47 to provide toe holds for entry into and climbing from the ice bunker.

At one end of the hatch closure B the hatch closure is mounted to the side wall 30 of the car by means of the hinges 48, the knuckles of which are fastened to the car side wall and the straps to the hatch closure B as best shown in Figs. 3 and 4. The side wall 45 is perforated to receive the sliding bolt 49 which is suspended in the stirrup 50, supported within the hatch closure from the upper surface plate 40. This bolt 49 can be manipulated only from within the car to pass through the side wall 45 of the hatch closure B to engage the adjacent beam suspended from the car ceiling to lock the hatch in horizontal position, or to be disengaged therefrom to unlock the hatch to enable it to be swung into vertical position.

When the hatch closure is locked in horizontal position, and the hatch cover 22 held in raised position, the perforations 46 through the upper surface plate 40 permit the free passage of air through the closure and into the car for the purpose of ventilation. If a solid plate 40 is desired, this may be mounted so as to leave a small crevice about its borders for ventilation.

When the hatch closure B is folded down against the side wall of the car as shown in Figs. 1 and 4, when the car is to be used for ice refrigeration, the perforations 46 permit the ready passage of air through the ice and through the upper surface plate 40, through the convection duct formed within the hatch closure B and through the car. The surface plate 40 of the hatch closure B, because of its construction, is spaced from the car wall by the end and side walls of the closure, and thus forms a duct between the side wall of the car and the ice with which the collapsible bunker may be filled. The hatch closure B thus serves when in lowered position as a convection duct and as one of the walls of the ice compartment.

In order to secure the hatch closure B in vertical position when swung down as shown in Figs. 1 and 4, small offset feet 83 may be mounted at the free end of the hatch closure to underlie the free end of the floor rack A. When the latter member is latched in vertical position, the hatch closure is similarly restrained.

*The upper and lower ice grates C and D*

To form the collapsible ice bunker the car is provided with two ice grates, the upper one of which is marked C and the lower one D. These grates are of substantially identical construction and are therefore described together. These ice grates are shown in extended position in Fig. 1 and in retracted condition swung into vertical position against the end wall of the car in Fig. 2. As shown in Fig. 3, they may be made in sections and in the preferred embodiment illustrated in the drawings each grate is shown as formed of three sections, each section extending across one-third of the width of the car.

The mounting of grates at two levels is designed to permit the loading of ice into the upper half of the ice bunker when less than a full bunker of ice is used. Frequently the distance to be traveled or the weather conditions encountered enable the car to be refrigerated with a small quantity of ice, and as most efficient cooling is effected by having the ice near the top of the refrigerating compartment, the upper grate C also serves as a horizontal support for the convertible bulkhead F when in extended position.

The ice grates are formed of the longitudinal frame members 51, the intermediate longitudinal bars 52 and the transverse grate bars 53. The bars 52 and 53 are secured to each other at right angles to provide a sturdy grate between the respective frame members 51.

Each of the frame members 51 is in the form of an L-shaped bar of which the short leg 54 at the end of the bar forms the strap by which each of the members 51 is pivotally mounted to the end of the car. It is to be noted that by reason of the L-shaped construction of the bar the pivot may be mounted within the duct 55, which is formed between the inner sheathing 12 of the end wall 10 and the grid or screen 56 which forms a permanent part of the end wall of the car. Thus, when the frame members 51 are swung into vertical position they may be maintained entirely upright and leave a substantial distance between the surface of the grate made up of the bars 52 and 53 and the actual wall of the car. Similarly, with this construction, the bars 51, when in vertical position, are entirely above the level at which they are sustained when in horizontal position. The purpose of this feature of the invention will be referred to later in the description of the movable bulkhead F. It is to be noted that either the upper ice grate C or the lower ice grate D can be operated independently of the other, and if a partial load of ice is to be employed it can be placed in either the compartment in the lower end of the bunker between the ice grate D and the upper ice grate C or preferably in the upper compartment between the ice grate C and the hatch.

Each of the longitudinal frame members 51 is notched at its outer end to form a keeper 57 designed to engage horizontal bolts 58 secured to the convertible bulkhead F so that the longitudinal frame members 51 when in horizontal position may be readily engaged to form horizontal supports for the bulkhead F, but nevertheless may be readily disengaged when the bulkhead is to be retracted.

Figure 12:
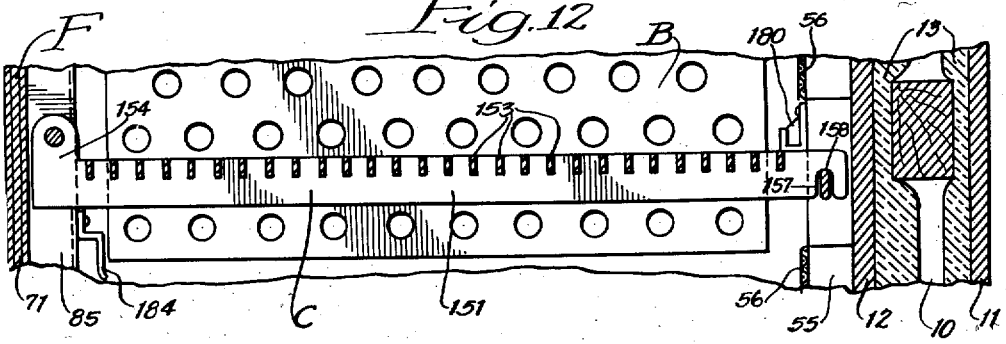
Fig. 12 is a fragmentary view of one of the ice grates in elevation, showing an alternative mounting with the ice-grate pivoted to the bulkhead and engaging a horizontal bolt secured to the end wall of the car.

If desired the ice grates C and D may be pivoted to the convertible bulkhead F. This alternative construction is shown in Fig. 12, where the grate bar 151 is pivoted to the bulkhead upon the horizontal pivot between the vertical channel beams 185 and ducts 170. The grate bar is L-shaped with the short leg 154 of the L serving as the hinge strap. The other end of the grate bar is notched to form a keeper 157 which engages a horizontal bar 158 secured to the end wall of the car.

To secure the grates C and D in vertical position when the ice bunker is collapsed, the pivoted latches 84 (Fig. 3) may be provided. These are secured to the grid 56 mounted upon the end wall of the car.

*Permanent base E for the convertible bulkhead*

Figure 6:
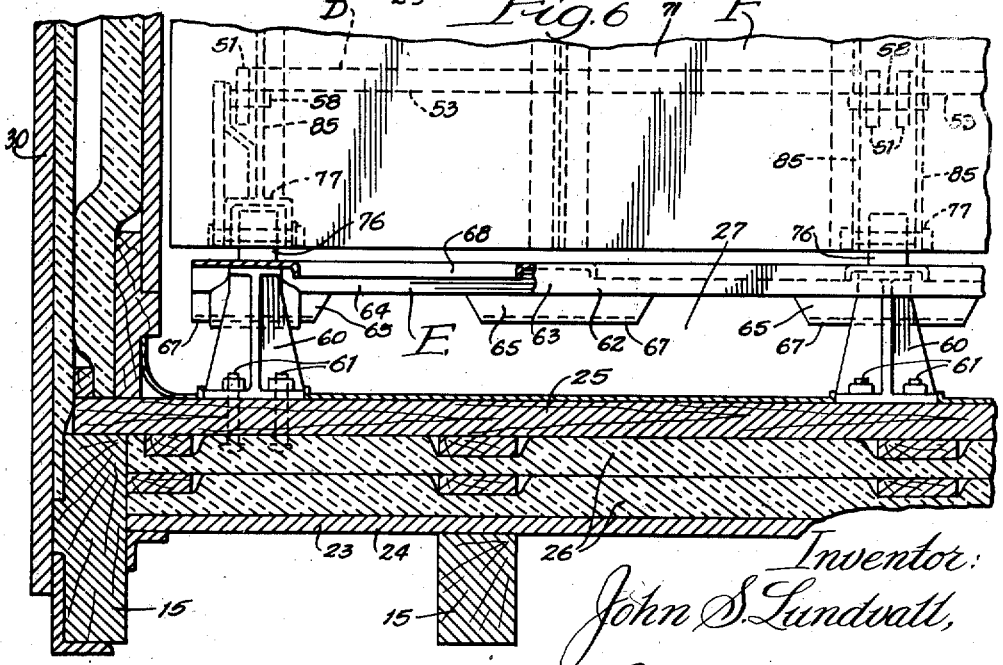
Fig. 6 is a fragmentary sectional view of a corner of the refrigerator car taken on the line 6—6 of Fig. 5.
Figure 7:
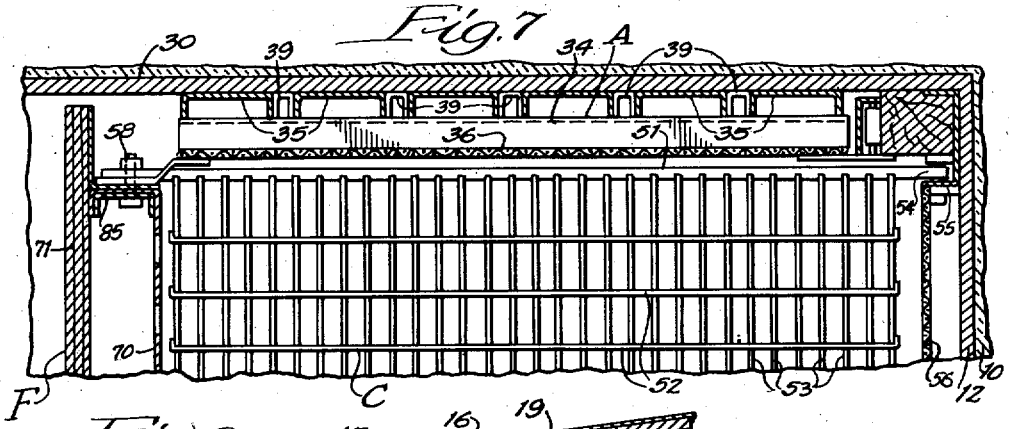
Fig. 7 is a sectional plan view of a fragment of the end of the car taken on the line 7—7 in Fig. 1.

Secured to the floor of the car is the transverse member E shown in fragmentary detail in Figs. 5 and 6 and shown in transverse section in Figs. 1 and 2. This member forms the permanent base for the convertible bulkhead when in extended position, and is composed of several pedestals 60 secured by bolts 61 to the floor of the refrigerator car. Secured to the top of these pedestals at the level of the car floor rack 27 is the beam 62 which runs almost the entire width of the car and is secured to the several respective pedestals 60. The beam 62 is, as best shown in Fig. 6, in the form of an inverted channel with a flange 63 along the edge nearest the interior of the car and a similar flange 64 on the other side of the beam. From the flange 64 extend the aprons 65 some of which rest upon the pedestals 60 and others of which are suspended. The horizontal terminations 67 of these aprons 64 form supports for the longitudinal members 34 of the collapsible floor rack.

The beam 62 is also perforated with a number of slots 68 which provide passage for air currents when the car is used either as a refrigerated car or as a ventilated car.

*The convertible bulkhead F*

The convertible bulkhead F is composed of a number of vertical channel beams 85 upon which are mounted the vertical ducts 70, and which form a vertical frame work for the horizontal planking 71 which forms the bulkhead proper and extends from the bottom edge to within a foot or two from the ceiling of the car. The ducts may be of any suitable number although in the preferred embodiment illustrated in the drawings, I have shown them of a size requiring six to extend the full width of the bulkhead or substantially the entire width of the car. The ducts and vertical channel beams are spaced apart at those places where the keeper 57 at the end of each of the respective grate bars 51 engages the horizontal bolt 58 which is secured to and extends between adjacent ducts.

To facilitate the circulation of cooled air from the ice bunker, the inner walls of these ducts may be perforated as indicated in Fig. 6.

The space provided between these adjacent ducts is sufficiently wide to receive the grate bars 51 when the ice-grates are swung into vertical position against the end of the car and the bulkhead is moved into retracted position against them. The L-shape of the grate bars 51, enabling them to swing into a vertical position above the space occupied when they are in horizontal position, insures that the lower end of the grate bars will clear the bolts 58 and permit the grate bars to nest between the vertical ducts and thus permit the bulkhead to be nested closely into the ice-grates C and D against the end wall of the car.

It is to be noted that when the bulkhead is in extended position as shown in Fig. 1 the vertical ducts 70 overlie the perforations 68 in the bulkhead base E, thus providing a continuous passage from the top of the car through the ducts 70, through the bulkhead base E, and beneath the floor rack 27 into the interior of the car.

Figure 8:
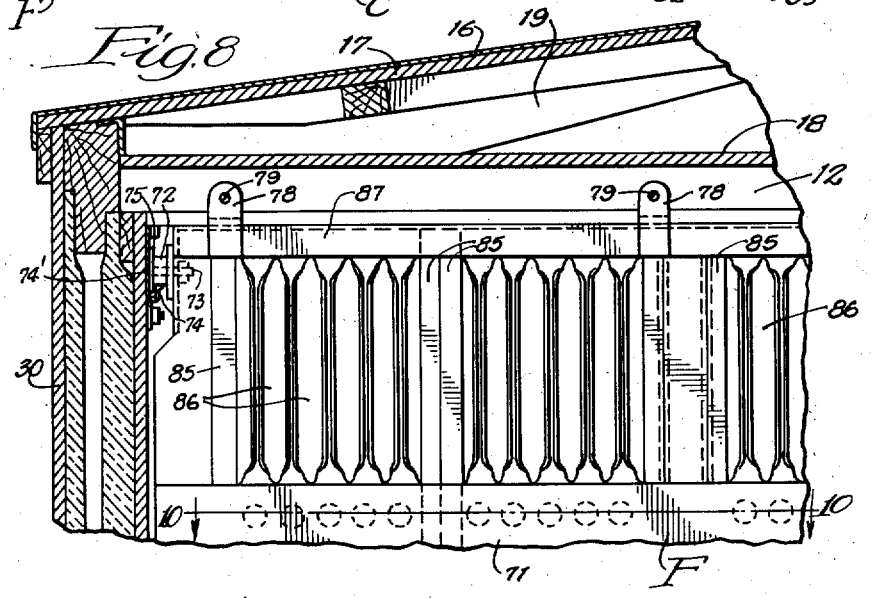
Fig. 8 is a fragmentary sectional elevation of the upper portion of the car taken on the line 8—8 of Fig. 1 showing the convertible bulkhead and the hanger by which the bulkhead is suspended.
Figure 9:
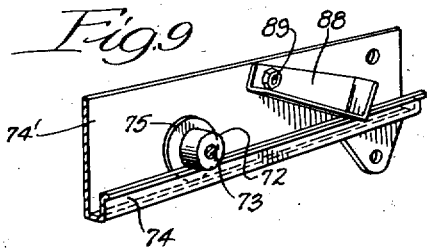
Fig. 9 is a perspective view of the bulkhead track and a swingable stop by which the bulkhead is kept in retracted position.
Figure 10:
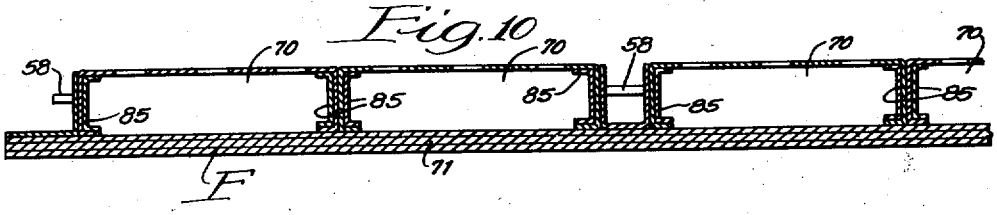
Fig. 10 is a transverse section through the bulkhead on the line 10—10 of Fig. 8.
Figure 11:
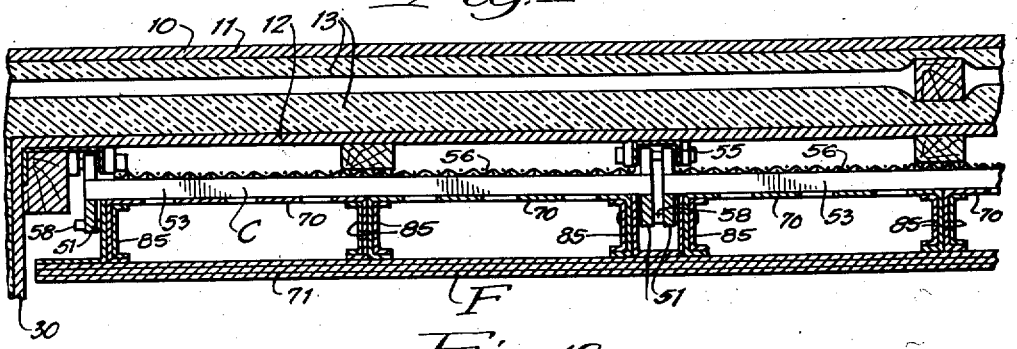
Fig. 11 is a transverse section through the bulkhead in retracted position, the adjacent ice grates, and the end wall of the car taken on the line 11—11 of Fig. 2, showing the bulkhead and ice grates nested into each other.

To permit a return flow of the air current from the lading into the ice bunker, the bulkhead planking 71 is not extended from the bottom of the bulkhead to the ceiling, but stops a foot or two from the ceiling, where the sheet metal is slotted with slots 86 which form louvres to permit the return flow of air. This is best shown in Fig. 8.

At the top of the bulkhead F and at each end thereof is mounted a small wheel 72, which rotates upon a spindle 73 secured to one side edge of the bulkhead. This wheel 72, which may be made with a guide flange 75 to retain it upon the track, rides upon a flanged track 74 formed upon the bulkhead hanger 74¹ which extends almost the entire length of the ice bunker and is secured to the inner sheathing of the side wall of the car. Although only one hanger 74¹ is shown in the drawings, a similar hanger is mounted upon the opposed side wall of the car.

The bulkhead F may thus be movably suspended from the side walls of the car by means of the hangers 74¹ and the wheels 72 which ride on the track 74 thereon.

If desired, the wheels 72 may be employed merely as guides to direct the movement of the bulkhead, which can be wholly supported upon the lower bearings or wheels 76, which are shown mounted at the bottom of the bulkhead in the form of small wide wheels 76 which are rotatably mounted in appropriate bearing structures 77, as indicated in Fig. 6. These are shown as overlying the pedestals 60 so as to give the bulkhead in extended position direct and firm bearing upon the car floor. When the bulkhead is moved, these bearings 76 ride upon the transverse floor members 35 and intervening fillers 39 in the floor rack A.

The top edge of the bulkhead is reinforced with a channel beam 87, which extends the full length of the bulkhead and provides a sturdy member by which the upper part of the bulkhead can be firmly held when the bulkhead is in extended position. This channel beam 87 is designed to be received within the legs of short sections of H-beam 78 which swing upon the pivots 79 within the ceiling of the car. When the bulkhead is in extended position and the lower legs of the H-bar embrace the channel beam 87 along the upper edge of the bulkhead they securely retain it in extended position.

The grate bars 51, when swung into horizontal position with their keepers 57 engaging the horizontal bolts 58, form firm structural units to maintain the bulkhead in vertical position and to sustain the bulkhead against the thrust and shocks of the ice load within the bunkers as the car travels. Small latches 80 are pivotally hung upon the inside of the bulkhead to lock the grate bars in horizontal position and to prevent their rising and disengaging the keepers 57 on the horizontal bolts 58.

To maintain the convertible bulkhead F in retracted position against the ice-grates C and D and against the end wall of the car, a pivoted detent 88 is swung on the pivot 89 secured to the hanger 74. When the bulkhead wheel 72 is in retracted position at the end of the rail 73 nearest the end of the car, this detent will swing into the path of the wheel and prevent movement of the wheel and suspended bulkhead.

*Operation of the convertible bulkhead*

Assuming the car to be in use as a ventilated car, the floor rack A and the hatch closure B will be in their respective horizontal positions, the one forming a portion of the car floor rack, the other a perforated grate below the hatch 21, and the convertible bulkhead F will be nested against the ice-grates C and D at the end of the car, all as shown in Fig. 2. To convert the bulkhead, in order to form the ice bunker needed for ice refrigeration, the bulkhead F is rolled out toward the interior of the car, the upper wheels 72 riding on the track 74 and lower wheels 76 upon the transverse planks 35 and fillers 39 in the floor rack A. Thereupon the retainers 78 can be swung down about the channel forming the top edge of the bulkhead F to retain the bulkhead in extended position.

When the bulkhead is in extended position, the floor rack A and hatch closure B can be swung into vertical position against the car wall, and secured there by latches 81 and 82.

Then the ice grates C and D can be unlocked by release of the latches 84 and the grates swung into horizontal position, the keepers 57 embracing the bolts 58 on the bulkhead. The latches 80 may then be swung against the grates to lock them in horizontal position. Each of the grates may be separately operated, and either one may be used alone. If both are used and a full load of ice is required, the lower compartment will be filled with ice before the upper grate is swung into horizontal position, and the upper compartment then filled. Both grates will be swung into position before the ice is loaded into the bunker if only the upper compartment above the grate C is to be filled.

If a greater volume of ice is required than can be loaded upon the grates C and D, the floor rack A can be left in a horizontal position and ice loaded thereon before the grates C and D are lowered.

It is also to be noted that in using the car as a ventilated car, the bulkhead can, if desired, be left in extended position and the car filled with lading on both sides thereof, the major portion of the lading borne on the floor rack 27 within the car, and the remainder on the floor rack A between the bulkhead and the end of the car, which necessarily must be left in horizontal position for such use.

Having thus described my invention, what I claim as new and desire to secure by Letters Patent of the United States is:

1. In a refrigerator car, a convertible ice bunker comprising a movable bulkhead, an ice grate pivotally mounted between said bulkhead and the end wall of the car and a floor rack pivoted to one of the car walls, said floor rack forming a convection duct when swung into vertical position adjacent the car wall.

2. In a refrigerator car, a convertible ice bunker comprising a movable bulkhead, a floor rack and hatch closure separately pivoted to the car walls and forming convection ducts along said walls when swung into retired position adjacent thereto, and an ice grate pivotally mounted between one of the car walls and the bulkhead and forming a horizontal support for said bulkhead when in extended position.

3. In a refrigerator car, a convertible ice bunker comprising a movable bulkhead, wheels upon said bulkhead, a floor rack pivoted to one of the car walls, said floor rack forming a convection duct when swung into vertical position adjacent the car wall and a track for said wheels when the floor rack is in horizontal position.

4. In a refrigerator car, a convertible ice bunker comprising a movable bulkhead, wheels upon said bulkhead, a floor rack pivoted to one of the car walls and forming a convection duct along said wall when swung into retired position adjacent thereto and a track for the wheels upon the bulkhead when the floor rack is in horizontal position, and an ice grate pivoted between one of the car walls and the bulkhead and forming a horizontal support for said bulkhead when in extended position.

5. In a refrigerator car, a convertible ice bunker comprising a movable bulkhead borne upon wheels at the bottom thereof, a floor rack and hatch closure separately pivoted to the car walls and forming convection ducts along said walls when swung into vertical position adjacent thereto, and a pivoted ice grate forming a horizontal support for said bulkhead when in extended position, said floor rack forming a track for the wheels upon the bulkhead.

6. In a refrigerator car, a convertible ice bunker comprising a movable bulkhead borne upon wheels at the bottom thereof and guided by a track suspended from the ceiling of the car, a floor rack pivoted to one of the car walls and forming a convection duct along said wall when swung into vertical position adjacent thereto and forming a track for the wheels at the bottom of the bulkhead when it is swung into horizontal position, and a pivoted ice grate within said bunker forming a horizontal support for said bulkhead when in extended position.

7. In a refrigerator car, a convertible ice bunker, comprising a hollow bulkhead supported in said car and movable to an extended position within the car to form an ice bunker at the end thereof, an ice grate pivoted between a car wall and said bulkhead, means on said grate to engage said bulkhead in extended position, said grate and said bulkhead forming a convection duct at the end of said car when in retracted position, and a hollow perforated base permanently mounted in said car to serve as a foundation for said bulkhead in extended position.

8. In a refrigerator car a bulkhead supported in said car and movable in to an extended position within the car to form an ice bunker at the end thereof, an ice grate pivoted between a car wall and said bulkhead and interlocking said car wall with said bulkhead in extended position to form a horizontal support therefor, a floor rack pivoted to one of the walls of said car, a perforated hatch closure pivoted to one of the walls of said car, said floor rack and hatch closure being swingable to form a perforate wall for said ice bunker and convection duct along said side of said car, and a permanent perforated base to support said bulkhead in extended position.

9. In a refrigerator car a movable hollow bulkhead, a fixed track secured within said car and near the ceiling thereof, wheels rotatably mounted upon said bulkhead and engaging said track, a latch to secure said bulkhead in extended position, a hollow perforated support secured to the floor of said car to sustain said bulkhead in extended position, and a pivoted horizontal bar between the end of said car and said bulkhead to interlock the two when said bulkhead is in extended position and to provide support therefor.

10. In a refrigerator car a hollow bulkhead supported in said car and movable into an extended position within the car to form an ice bunker at the end thereof, channels in the wall of the bulkhead, ice grates pivotally mounted between the end wall of the car and said bulkhead in extended position to form a horizontal support therefor, said ice grates nesting into said channels when said ice grates are swung into vertical position between the end wall of the car and said bulkhead in retracted position.

11. In a refrigerator car a movable hollow bulkhead, a fixed track secured within said car and near the ceiling thereof, wheels rotatably mounted upon said bulkhead at the top thereof and engaging said track, other wheels rotatably mounted upon said bulkhead at the bottom thereof, a support secured to the floor of said car to sustain said bulkhead in extended position, a horizontal bar pivotally secured to the end of said car to engage said bulkhead in extended position and provide support therefor, and a pivoted floor rack resting upon said base when in horizontal position and forming a track for the wheels upon the bottom of the bulkhead and forming a convection duct along the car wall when in vertical position adjacent thereto.

12. In a refrigerator car, a convertible ice bunker comprising a movable bulkhead, a permanent base to support said bulkhead in extended position, ice grates pivoted to one of the car walls and swingable into horizontal position to secure said bulkhead in extended position, a floor rack pivoted to one of the car walls, and a perforate closure for the car hatch pivoted to one of the car walls, said floor rack and said closure forming convection ducts when swung into vertical position adjacent the car wall.

13. In a refrigerator car, a convertible ice bunker comprising a movable bulkhead, wheels upon the bottom of said bulkhead, ice grates pivoted to one of the car walls and swingable into horizontal position to support said bulkhead in extended position, a floor rack pivoted to one of the car walls, said floor rack forming tracks for said wheels, a closure for the car hatch pivoted to one of the car walls, said floor rack and said closure forming convection ducts when swung into vertical position adjacent the car wall, and a permanent base within the car to receive said wheels and sustain said bulkhead in extended position.

14. In a refrigerator car, a convertible ice bunker comprising a movable bulkhead, a floor rack and hatch closure separately pivoted to the car walls and forming convection ducts along said walls when swung into retired position adjacent thereto, and ice grates pivotally mounted within said bunker and each forming a horizontal support for said bulkhead when in extended position, said ice grates being independently swingable from vertical to horizontal position.

15. In a refrigerator car, a convertible ice bunker comprising a movable bulkhead supported in vertical position upon wheels, a floor rack pivoted to one of the car walls and forming a convection duct along said wall when swung into vertical position adjacent thereto, and forming tracks for said wheels when in horizontal position, and ice grates pivoted between the car walls and said bulkhead and forming a horizontal support for said bulkhead when in extended position, said ice grates nesting into said bulkhead when the ice grates are swung into vertical position and said bulkhead is moved into retracted position against the end wall of the car.

16. In a refrigerator car having a hatch in the top thereof, a perforate closure pivotally mounted beneath said hatch and swingable into vertical position adjacent a wall of said car, a floor rack pivotally mounted on a wall of said car and swingable into vertical position beneath said closure, disengageable means to secure said closure and said rack in vertical position, said hatch closure and said floor rack forming a convection duct along the wall of said car when in vertical position; a bulkhead supported upon wheels in said car and movable from the end of said car to an extended position beyond said hatch and said hatch closure; means upon said floor rack to form tracks for said wheels; an ice grate pivotally mounted and swingable into a horizontal position between the end of said car and said bulkhead; and means upon said ice grate to secure said bulkhead in extended position, said ice grate and said bulkhead when in extended position forming an ice bunker beneath said hatch, said bulkhead having channels in the wall thereof to receive said ice grates when said bulkhead is in retracted position and said ice grate in vertical position.

17. In a refrigerator car having a hatch in the top thereof, a perforate closure pivotally mounted beneath said hatch and swingable into vertical position adjacent a wall of said car, a floor rack pivotally mounted on a wall of said car and swingable into vertical position beneath said closure, disengageable means to secure said closure and said rack in vertical position, said hatch closure and said floor rack forming a convection duct along the wall of said car when in vertical position; a bulkhead supported upon wheels in said car and movable from the end of said car to an extended position beyond said hatch and said hatch closure, means upon said floor rack to form tracks for said wheels, an ice grate pivotally mounted and swingable into a horizontal position between the end of the said car and said bulkhead, and a permanent perforate base forming a seat for one side of said floor rack when in horizontal position and a base for said bulkhead when in extended position.

18. In a refrigerator car a vertical bulkhead movably supported in the car and movable to an extended position within the car to form an ice bunker at the end thereof, means to lock the upper end of the bulkhead in its extended position, an ice grate pivoted between a car wall and the bulkhead and interlocking the car wall with the bottom portion of the bulkhead in extended position to form a horizontal support therefor, and a second ice grate pivoted between a car wall and the bulkhead intermediate the ends of the bulkhead and interlocking the car wall with the central portion of the bulkhead in extended position to form a second horizontal support therefor.

19. In a refrigerator car having a lading supporting floor and a ceiling, a convertible ice bunker comprising a hollow bulkhead extending substantially from the floor to the ceiling supported in said car and movable from a stored position adjacent the end of the car to an extended position within the car to form an ice bunker at the end thereof, a stationary perforated base rigidly mounted in said car to serve as a foundation for said bulkhead in extended position and to provide air passages into said hollow bulkhead, and means to secure said bulkhead in extended position.

20. In a refrigerator car, a lading compartment, a hollow bulkhead supported in said car and movable from a stored position adjacent the end of the car to an extended position within the car to form an ice bunker at the end thereof, and to separate said ice bunker from said lading compartment, a base permanently mounted in said car underlying said bulkhead in extended position and having perforations therethrough to permit the passage of air beneath said bulkhead between said bunker and the lading compartment of the car, and having perforations through the top of said base to permit the passage of air through said hollow bulkhead and the top of said base.

21. In a refrigerator car having a convertible ice bunker at the end thereof, a hollow bulkhead having a perforated bottom and movable from a stored position adjacent to the end wall of the car to an extended position within the car to divide the car into a lading compartment and an ice bunker, a solid floor throughout said car, a perforated lading floor in said lading compartment spaced from said solid floor to support the lading in spaced relation therefrom and to permit air circulation between said floors, an ice grate in said bunker spaced from said solid floor to support ice in spaced relation therefrom and to permit air circulation between said grate and said solid floor, and a transverse beam permanently mounted in the car between the lading floor and the ice grate and underlying the bulkhead in extended position, said beam being supported above the solid floor to permit the passage of air from the space beneath the ice grate to the space beneath the lading floor when the bulkhead is in extended position and having perforations in the upper surface thereof to provide air passages into said hollow bulkhead.

22. In a refrigerator car having an ice bunker at an end thereof, a lading compartment adjacent to and separated from said ice bunker by a hollow bulkhead, said bulkhead having an open bottom and being movable from its bunker-forming extended position to a stored position adjacent to and parallel with the end wall of the car, a foraminous lading floor in said lading compartment adapted to support the lading in spaced relationship with the car floor and to provide air circulation between the lading and said car floor, a foraminous ice supporting grate in said ice bunker adapted to support the ice in spaced relationship with said car floor and to provide air circulation between said grate and said car floor, a jamb member extending transversely of the car in adjacent underlying relationship with the bottom portion of said bulkhead when in extended position, said jamb being adapted as an anchoring member for securing the lower portion of the bulkhead in extended position or as a means for supporting said bulkhead if it should sag, said jamb being supported above the car floor by means of spaced apart support members, the space between adjacent support members providing air communication between the space underneath the lading and the space underneath the ice grate, the upper surface of the lading floor, the ice supporting grate and said jamb being perforated and lying substantially in a common horizontal plane whereby to provide a substantially flush lading floor throughout the length of the lading compartment when said bulkhead is in stored position, the location of said ice supporting grate substantially flush with said lading floor providing an ice bunker of maximum ice capacity.

23. In a refrigerator car, an ice bunker in one end thereof, an adjacent lading compartment, a transverse bulkhead separating the lading compartment from the ice bunker and movable from a stored position adjacent the end of the car, floor racks supported in overlying spaced relation with the floor of the bunker and with the floor of the lading compartment, and a transversely extending base rigidly affixed to the car between the floor rack of the lading compartment and the floor rack of the ice bunker and substantially coplanar therewith, said base being adapted to support said bulkhead when in bunker forming position and supported in overlying spaced relation with the car floor to provide an air passage between said base and said floor.

24. In a refrigerator car an ice bunker in one end thereof, an adjacent lading compartment, a transverse hollow bulkhead separating the lading compartment from the ice bunker and movable from a stored position adjacent the end of the car to a bunker forming position spaced from the end of the car, floor racks supported in overlying spaced relation with the floor of the bunker and with the floor of the lading compartment, and a transversely extending base rigidly affixed to the car between the floor rack of the lading compartment and the floor rack of the ice bunker and substantially coplanar therewith, said base being adapted to support said bulkhead when in bunker forming position and supported in overlying spaced relation with the car floor to provide an air passage between said base and said floor, said base and the hollow bulkhead being so constructed and arranged as to provide air passages therebetween to permit passage of air through the bulkhead into the space between the floor racks and the floor.

JOHN S. LUNDVALL.